United States Patent [19]
Bissell et al.

[11] 3,857,286
[45] Dec. 31, 1974

[54] ZERO ADJUSTMENT GAUGE INSTRUMENT

[75] Inventors: Robert Donald Bissell, Orange; Edward Joseph Plavcan, Stratford, both of Conn.

[73] Assignee: Dresser Industries, Inc., Dallas, Tex.

[22] Filed: Sept. 19, 1973

[21] Appl. No.: 398,717

Related U.S. Application Data

[63] Continuation of Ser. No. 190,026, Oct. 18, 1971, abandoned.

[52] U.S. Cl. ............................ 73/363.9, 116/129 A
[51] Int. Cl. ........................ G01k 5/64, G01k 15/00
[58] Field of Search ................ 73/363.9, 431, 363.7; 116/129 A

[56] References Cited
UNITED STATES PATENTS

| | | | |
|---|---|---|---|
| 2,250,231 | 7/1941 | Nodine | 73/363.7 |
| 2,803,137 | 8/1957 | Bradley | 73/363.7 |
| 3,122,018 | 2/1964 | Freeman et al. | 73/363.9 |
| 3,124,003 | 3/1964 | Gorgens | 73/363.9 |
| 3,161,057 | 12/1964 | Du Bois | 73/363.9 |
| 3,279,257 | 10/1966 | Hunt | 73/363.9 |
| 3,394,593 | 7/1968 | Aldridge et al. | 73/363.9 |
| 3,491,598 | 1/1970 | Wetterhorn | 73/363.9 |

Primary Examiner—Richard C. Queisser
Assistant Examiner—Daniel M. Yasich
Attorney, Agent, or Firm—Daniel Rubin

[57] ABSTRACT

A gauge instrument having a casing of axially contiguous coaxial components angularly displaceable relative to each other for the purpose of effecting zero instrument adjustment. One of the casing components secures the operative instrument while the other component secures a calibrated dial with which the instrument cooperates to provide a visual operating readout of condition values being measured. A sheet metal frictional mount between the casing components affords a minimum cost element to readily enable said angular displacement.

5 Claims, 4 Drawing Figures

PATENTED DEC 31 1974 3,857,286

ROBERT D. BISSELL
EDWARD J. PLAVCAN
INVENTORS
BY Daniel Rubin
ATTORNEY

ZERO ADJUSTMENT GAUGE INSTRUMENT

This is a continuation of application Ser. No. 190,026 filed Oct. 18, 1971, and now abandoned.

BACKGROUND OF THE INVENTION

1. The field of art to which the invention pertains includes the art of gauge instrumentation and in particular to housing or case constructions therefor.

2. Casings are widely used to enclose and generally protect working components of the instruments against their service environment. In this capacity, the casing is not instrumentally functional per se but nonetheless represents a significant expense item in the overall manufacturing cost of the instrument. Such casings and the instrument they enclose are suitable for various type service, as for example pressure or temperature sensitivity, and are frequently manufactured as low cost, high volume, high production units. Where these units are of the low cost variety, their construction usually lacks many of the more sophisticated adjustment features available on more expensive instruments of a similar type. Notwithstanding, it is usual even in the low cost variety to provide the instrument with a zero adjustment setting which can be field set by the customer in a well known manner should the need be incurred.

While it is desirable to include this adjustment feature in these low cost instruments, it is likewise desirable from a marketing point of view that the feature per se not comprise a significant expense item as will significantly contribute to increasing the overall cost of the casing. Typical prior art construction for that purpose has used relatively expensive bar stock materials with spring washers or the like for frictional angular displacement between contiguous casing components in order to effect the adjustment. Whereas such assemblies have proven to be a highly serviceable construction the elements utilized are known to be excessively costly for the instrument markets in which they are being sold. Despite recognition of the problem, it has not been known heretofore how to eliminate the high cost of this feature while maintaining its effective operability.

SUMMARY

This invention relates to a gauge instrument and particularly to a novel case construction affording a low cost zero adjustment feature for the relatively low cost variety of such instruments. Similarly as before, the instrument casing hereof is comprised of axially contiguous components frictionally mounted for coaxial angular displacement relative to each other. Unlike the prior art, the mounting construction in accordance herewith utilizes a low cost sheet metal sleeve-like member of annular, somewhat frustro-conical configuration secured to one casing component in a forced axial engagement against the other casing component. When so engaged, the member incurrs a radial deflection imposing a frictional restraint against relative angular displacement therebetween the level of which can be readily overcome for purposes of effecting the adjustment. By this means, the expensive elements previously required for similar purpose mountings are thereby eliminated as to render such construction more favorably cost competitive with constructions on which the zero adjustment is not similarly manufactured.

It is therefore an object of the invention to provide a gauge instrument having a novel low cost zero adjustment feature.

It is a further object of the invention to provide a gauge instrument in accordance with the aforesaid object that enables relative angular displacement between contiguous case components yet eliminates the relatively expensive elements previously required for that purpose.

BRIEF DESCRIPTION OF THE DRAWINGS

FIG. 1 (A) is a fragmentary isometric view of an optional modification to the construction of FIG. 1;

Figure 1:
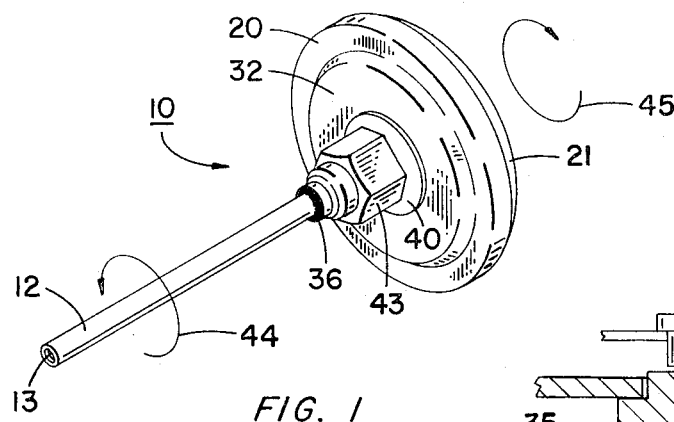
FIG. 1 isometrically illustrates a gauge instrument in accordance herewith as viewed from its underside.
Figure 1A:
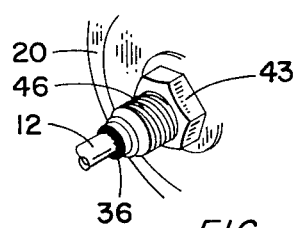
Figure 3:
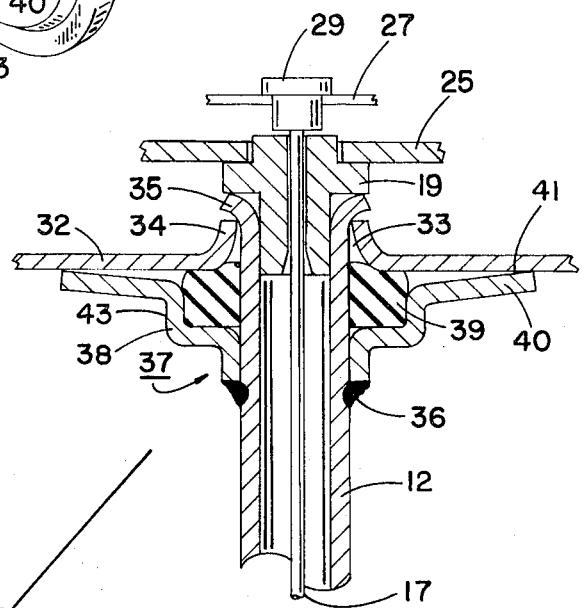
FIG. 3 is a fragmentary enlargement of the encircled portion of FIG. 2.
Figure 2:
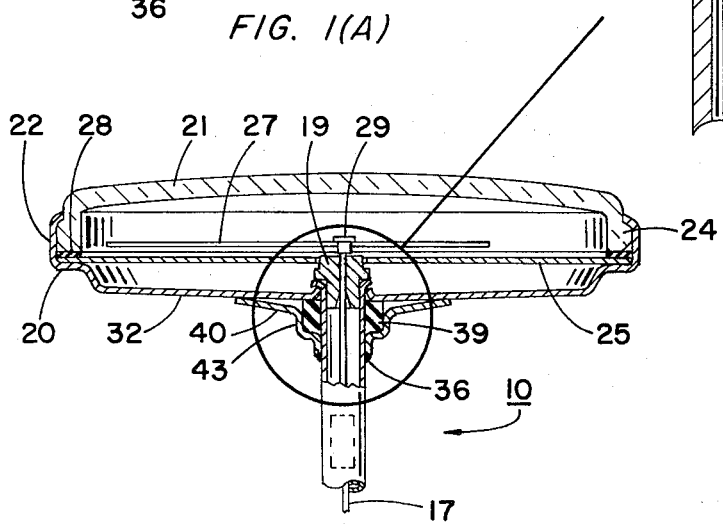
FIG. 2 is a sectional elevation of a temperature gauge in accordance herewith.
Figure 2:
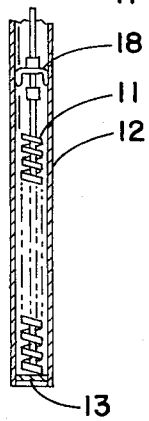

Reference is now made to the drawings which for purposes of disclosure illustrate a gauge instrument 10 of the thermometer type. As is common in this type instrument, it includes a helically wound bi-metal coil 11 contained in an elongated tubular stem 12 sealed at its lower end by a plug 13. The stem comprises the lower casing component and is adapted for inserting coil 11 into a well or other temperature changing environment in which temperature determination is to be sought. Coil 11 is suitably anchored at its lower end to either the tube wall or plug thereat and at its upper end is operably connected to a thin, elongated rotatable shaft 17. The shaft in turn is rotatably guided within stem 12 by a guide support 18 and a bearing 19 from where its upper end emerges into an axially contiguous component in the form of case 20. On its topside the case includes a transparent window or crystal 21 secured gripped to the case by annular case side wall 22. Beneath peripherially annular crystal flange 24 is a complementary gasket 28 securing a dial plate 25 in its position within the case. Plate 25 includes calibrations (not shown) on its top face of a temperature range within which the instrument is to be operative. Immediately above bearing 19 there is secured to shaft 17 a bead or spool 29 supporting a pointer element 27.

Such instruments operate in a well known manner, and may for example be of the general type disclosed in patent U.S. Pat. No. 3,096,651. Coil 11 produces winding and unwinding motion in response to temperature changes incurred by the measured environment. This motion in turn produces angular displacement of pointer 27 relative to dial face 25 for an accurate visual temperature indication on a continuing basis. As thus far described the operative instrument portion namely, coil 11, is secured to stem 12 comprising a first axial contiguous component of the casing while dial plate 25 with which the instrument cooperates in providing a visual readout is contained in case 20 comprising the second axially contiguous component of the casing.

The assembled mount or connection between the two casing components provides the novel features in accordance with the objectives of the invention to enable zero adjustment of the instrument. For these purposes, a radial backwall 32 of case 20 includes a central aperture 33 about which the wall is flared or extruded annularly inward at 34. Received through aperture 33 is the upper terminal end of stem 12 flared or extruded annularly outward at flange 35. By so engaging the topside of flange 34 separation of stem and case from opposite forces directing the flanges toward each other is prevented.

Secured as by welding to stem 12 at weld 36 displaced from the underside of backwall 32 is an annular sheet metal outlet sleeve or skirt 37. The skirt includes an annularly enlarged internal recess 38 for receiving an annular resilient gasket 39. Upwardly therefrom, as viewed in the drawings, the recess portion of the sleeve merges with a predominantly radially extending annular flange 40 of somewhat frustroconical configuration. When assembled in the manner illustrated, sleeve 37 is an axially forced engagement against the exterior surface of backwall 32 for reasons as will be understood.

Outlet sleeve 37 is stamped or otherwise formed from inexpensive commercially available sheet metal strips, preferably of stainless steel, on the order of about 0.020 inch thickness. Preferably, sleeve 37 is secured to stem 12 prior to assembly of the latter to case 20 in order that in the ultimate assembly a frictional hold is exerted against backwall 32 on the order of 5 to 10 inch lbs. For this reason, with the sleeve on stem 12, the end face of flange 40 is first placed in axially forced engagement against backwall 32 causing it to incur rearward deflection spreading or increasing its diverging face angle. In this position, flange 35, being situated above flange 34, is staked onto the latter whereby to place the axially contiguous casing components in a relative tension relation but rotatably displacable relative to each other.

The magnitude of frictional restraint imposed by flange 40 against surface 32 is not critical. As a minimum the restraining force should prevent inadvertent self displacement from vibration or the like between stem 12 and case 20 and as a maximum should be generally within a range afforded by a hand grip on case 20 and a wrench grip on hex nut 43. This then will permit the desired degree of relative displacement in the manner diagrammatically illustrated by arrows 44 and 45. The aforementioned torque ranges have been found generally suitable for that purpose. For threading the instrument into a well or the like, the axial under portion of sleeve 37 can be provided with threads 46 as illustrated in the optional modification of FIG. 1 (A).

By the above description there is disclosed a novel and unique assembly between the separate axially contiguous components of an instrument casing permitting angular displacement therebetween for the purpose of effecting zero adjustment of the instrument. By utilizing a frictional engagement between staked parts afforded by a deflected, minimum cost, sheet metal member, the expense previously associated with such mounts is substantially eliminated as compared to such constructions of the prior art. By virtue of the significant cost reduction afforded thereby, a substantial saving in the overall construction of a high production item is similarly afforded for an instrument otherwise regarded as a low cost item sold in highly competitive commercial markets. Such construction can be regarded as a symbol of simplicity while yet retaining all the previous operating characteristics by which such zero settings have been attained in accordance with similar purpose constructions of the prior art.

Since many changes could be made in the above construction and many apparently widely different embodiments of this invention could be made without departing from the scope thereof; it is intended that all matter contained in the drawings and specification shall be interpreted as illustrative and not in a limiting sense.

The embodiments of the invention in which an exclusive property or privilege is claimed are defined as follows:

1. In a gauge instrument including a casing of assembled axially contiguous first and second coaxial components in which the first of said components comprises a cup-like case containing calibrated indicia of condition values and the second of said components comprises a relatively rotatable tubular stem containing a condition responsive means operably cooperative with said indicia for visual indication of condition values being measured and means forming an interlock against axial self disassembly of said components, the improvement for zero adjustment comprising mounting means securing said casing components for coaxial angular displacement therebetween, said mounting means consisting essentially of an annular sheet metal sleeve of diameter larger than said stem coaxially secured permanently thereon for relative rotation therewith and terminating in an annular flange enlargement extending predominantly in a radial direction, said sleeve being secured with the contiguous peripheral face surface of its flange in axially forced engagement against an external facing surface of said case axially deflecting said flange enlargement for said engaging surfaces to provide a predetermined frictional restraint against said angular displacement.

2. In the improvement according to claim 1 in which said forced engagement effects a relative tension relation between said components.

3. In the improvement according to claim 1 in which said flange enlargement is of generally frusto-conical configuration of angular divergence that is increased by the incurred axial deflection of said forced engagement.

4. In the improvement according to claim 3 in which said predetermined frictional restraint is approximately in the range of about 5 to 10 inch-pounds.

5. In a gauge instrument according to claim 1 in which said condition responsive element comprises a spiral wound bi-metallic element adapted for winding and unwinding motion in response to temperature changes to which it is subjected.

* * * * *